United States Patent

Stanton et al.

Patent Number: 5,667,046
Date of Patent: Sep. 16, 1997

[54] TEMPERATURE COMPENSATING ROLLER CLUTCH CAGE

[75] Inventors: Ellen Christine Stanton, Butler; Albert David Johnston, Huron, both of Ohio

[73] Assignee: General Motors Corporation, Detroit, Mich.

[21] Appl. No.: 650,706

[22] Filed: May 20, 1996

[51] Int. Cl.$^6$ ............................................. F16D 41/067
[52] U.S. Cl. .................... 192/45; 188/82.84; 384/557; 384/905
[58] Field of Search ................ 192/45, 44; 188/82.84; 384/557, 576, 905

[56] References Cited

U.S. PATENT DOCUMENTS

| | | | |
|---|---|---|---|
| 4,054,192 | 10/1977 | Johnson | 192/45 |
| 4,570,762 | 2/1986 | Husmann | 188/82.84 |
| 4,712,661 | 12/1987 | Lederman et al. | 192/45 |
| 4,830,157 | 5/1989 | Lederman | 192/45 |
| 4,850,463 | 7/1989 | Lederman | 192/45 |
| 4,874,069 | 10/1989 | Lederman | 192/45 |
| 5,062,512 | 11/1991 | Lederman | 192/45 |

*Primary Examiner*—Richard M. Lorence
*Attorney, Agent, or Firm*—Patrick M. Griffin

[57] ABSTRACT

A one piece, molded plastic roller clutch cage has the heavy, rigid cross bars of adjacent pockets joined together by circumferentially flexible connecting members. The connecting members are located entirely within the space between pockets, and have no effect of the shape or structure of either the side rails or the cross bars of the pockets. When the cage expands or contracts with rising or falling temperatures, the curved connecting members can open or close, allowing the adjacent cross bars of adjacent pockets to move together or apart, thereby avoiding excess compression or tension in the cage.

3 Claims, 3 Drawing Sheets

TEMPERATURE COMPENSATING ROLLER CLUTCH CAGE

This invention relates to roller clutch cages in general, and specifically to such a cage which provides a novel means for allowing the cage to compensate for differential rates of temperature induced expansion and contraction relative to the clutch races.

BACKGROUND OF THE INVENTION

Roller clutches are installed between inner and outer coaxial clutch races so as to create a one way braking action between the races. The main structural component of the roller clutch is a cage, which is basically a ring of interconnected, four sided pockets, each of which pockets contains a roller and its associated energizing spring. Increasingly, such cages are molded of plastic, for weight and cost reasons. A familiar problem to designers of molded plastic roller clutch cages is the differential rate of expansion and contraction that exists between the plastics typically used and the races themselves, which are machined from steel. Specifically, with rising temperatures, the cage tends to expand more than the outer race, binding into it and potentially buckling in compression. With falling temperatures, the cage tends to contract more than the inner race, binding around it in tension. A certain amount of "give" in the cage to allow it to accommodate these differential temperature effects without excessive cage compression or tension is desirable.

Several known methods for building give into the cage are disclosed in older U.S. patents. In co assigned U.S. Pat. No. 4,045,192 to Johnson, each roller pocket is a separately molded piece that is snapped to the next with a joint that has some looseness or "rattle" built into it. Each pocket can move freely back and forth, at least within the limits of the joints, allowing the cage to shrink or grow freely to prevent excess tension or compression. However, a multi piece cage is the most expensive to manufacture and assemble, and a one piece cage is much preferred.

The plastic cage shown in the now expired U.S. Pat. No. 4,570,762 to Husmann takes the different approach of a cage which, while not totally one piece, has only two unitary side rails 4 and 5 which snap together to form a plurality of pockets. The side rails are provided not with loose or rattling joints, but with what are supposed to be flexible are shaped elements 26 and 27 molded into the side rails 4 and 5 at several points. The are shaped elements 26 and 27 are arrayed in radially opposed pairs, opening away from one another. Even though the side rails 4 and 5 are as radially wide as they can possibly be, that is, nearly as wide as the radial space between the clutch races, the elements 26 and 27 are limited in depth to less than half the side rail's radial thickness. And since the arms of the U shaped elements 26 and 27 are so limited in length, they are inevitably stiffer than they would be if they could be made longer. More important, since the side rails 4 and 5 must support the load between the races (the cage has no journal blocks as such), the elements 26 and 27 cannot be made too flexible without inevitably weakening the side rails 4 and 5, in which they are clearly the weakest link. More significant, the Husmarm approach would be impossible in anything but a cage design with full radial width side rails. Today, cage side rails are far more likely to have an "over-under" design in which each side rail is half that radial width or less, in order to allow the cage to be molded in one piece with only two molds.

Another basic approach is to cut relief slots through the cage at various points around it's circumference, which slots open in alternating axial directions, usually one slot for each pocket. The slots create alternating hinge points about which the pockets can flex or bend relative to one another, effectively allowing the cage to give as it shrinks or expands. However, such slots may cut completely through the cage pocket side rails, as in co assigned U.S. Pat. No. 4,712,661 to Lederman, weakening the side rails even more than in the Husmann patent discussed above and destroying the structural completeness of the roller pockets. In an improved version of the basic slot design shown in co assigned U.S. Pat. No. 4,830,157 to Lederman, structurally complete, four sided roller pockets are provided, but at the expense of cutting slots through the journal blocks so that one of the roller pocket cross bars 38 can run through the slot. This inevitably weakens the journal block, which is no longer radially solid. Any slotted cage also suffers from the drawback that the various pockets tip or skew relative to one another about the alternating hinge points left by the slots, and, if an odd number of pockets and slots exists, the skewing action can lead to cage distortion.

The latest design that allows for an even, non distorting cage "give", while still providing structurally complete, four sided roller pockets, is shown in co assigned U.S. Pat. No. 4,850,463 to Lederman. The design takes a different approach to providing "give" in the cage circumference, with no yield points molded into the side rails and no slots cut into the cage. Each cage pocket is four sided and complete, but one cross bar 18 in each pocket is deliberately made thinner in order to be relatively flexible. Each flexible cross bar 18 is then connected to a stiff cross bar 20 of the adjacent pocket by an inflexible and centrally located connector 22. When the cage shrinks or expands, the stress is concentrated by the connectors 22 at the centers of the thin cross bars 18, which bow in or out at the center to provide the necessary give. The flexure is evenly and symmetrically distributed. However, prior to installation, the roller pockets can skew or tip relative to one another about the single, centrally located connector. Also, only the heavier cross bars 20 on one side of each roller pocket are thick and strong enough to act as so called journal blocks to keep the races coaxial and transfer loads. Ideally, all roller pockets would be bordered by two thick (and inflexible) cross bars that were able to provide load support between the races. Providing that ideal case and yet still providing the necessary flex and give in the cage to accommodate temperature effects, without cage distortion prior to installation, remains an unmet design challenge.

SUMMARY OF THE INVENTION

The invention provides a one piece, easily molded plastic roller clutch cage with structurally complete, four sided roller pockets, in which each pocket includes two heavy cross bars that can serve as journal blocks. Enough flex and give is built into the cage independently of the roller pockets to accommodate differential expansion and contraction without cage distortion.

In the preferred embodiment disclosed, the part of the cage that is flexible is not incorporated in any part of the roller pockets, either the side rails or journal block cross bars. Instead of a rigid connector between adjacent cross bars of adjacent pockets, the very different approach of a flexible roller pocket connector is used. In the embodiment disclosed, pairs of flexible connectors are used, each of which is curved and opens in opposite directions. The connector pairs are also axially spaced, parallel to the central plane of the cage. Therefore, prior to installation, the cage is structurally solid, in that the adjacent roller pockets are strongly prevented from skewing or tipping relative to one another by the axially spaced pairs of connectors. After installation, with rising temperature and resultant cage expansion, each connector pair can close up and narrow, allowing the roller pockets to move toward one another and prevent cage over compression. With falling temperature and resultant cage contraction, each connector pair Can open and widen, allowing the roller pockets to move apart and prevent excessive cage tension around the inner race. The cage connectors are configured without radial overlap, so that the entire cage can be easily molded, and the axial spacing of the connectors leaves a clear path for a radially outwardly directed lubricant flow.

DESCRIPTION OF THE PREFERRED EMBODIMENT

These and other features of the invention will appear from the following written description, in which.

Figure 1:
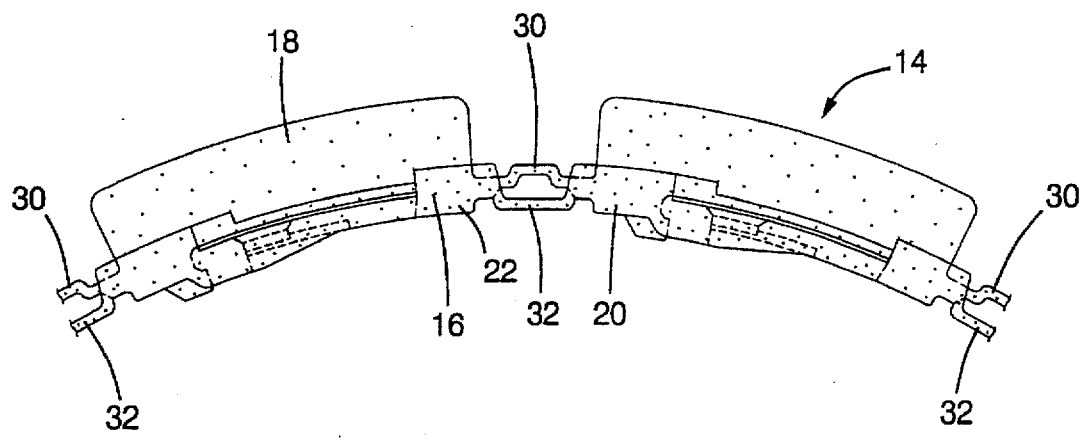
FIG. 1 is a side view of two roller pockets of a preferred embodiment of the invention before installation.
Figure 2:
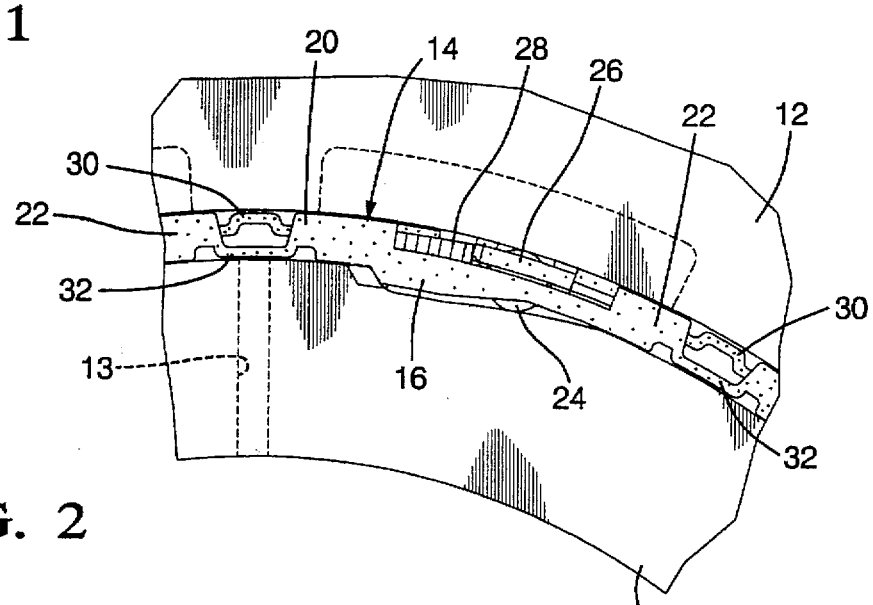
FIG. 2 is a side view of the same portion of the clutch installed between the races.
Figure 3:
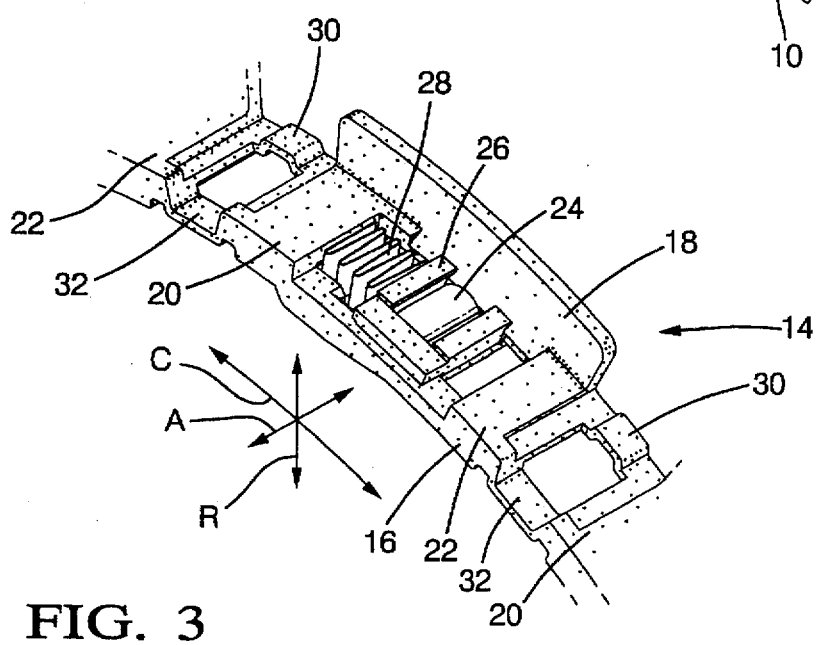
FIG. 3 is a perspective view of the same portion of the clutch before installation.

Referring first to FIGS. 1 through 3, a pair of inner and outer clutch races 10 and 12 are incorporated in an automatic transmission or other application where a one way braking action between the two is desired. Here, outer race 12 is allowed to rotate counterclockwise relative to inner race 10, but is locked up if it tries to rotate relatively clockwise. The races 10 and 12 form an annular space therebetween with a predetermined radial thickness when they are maintained coaxial. FIG. 3 shows a suitable reference frame for the races 10 and 12 and the radial space between them. Line "A" indicates the central axis of the races 10 and 12, semi-circle "C" represents a circle in about the center of the radial space, indicating the circumferential direction, and line "R" represents the radial direction perpendicular to A, moving across the radial space. Each race 10 and 12 is machined from suitable steel, inner race 10 with the familiar saw toothed configuration and outer race 12 with a cylindrical inner surface. The races 10 and 12, being of like material, respond with a similar expansion and contraction rate to temperature increases and decreases relative to a nominal operating temperature. In the embodiment disclosed, the inner race 10 also has at least one lubrication passage 13 drilled radially and centrally through it, which feeds pressurized lubricant out into the radial space between the races and, ideally, evenly and freely to the inner surface of the outer race 12.

Figure 4:
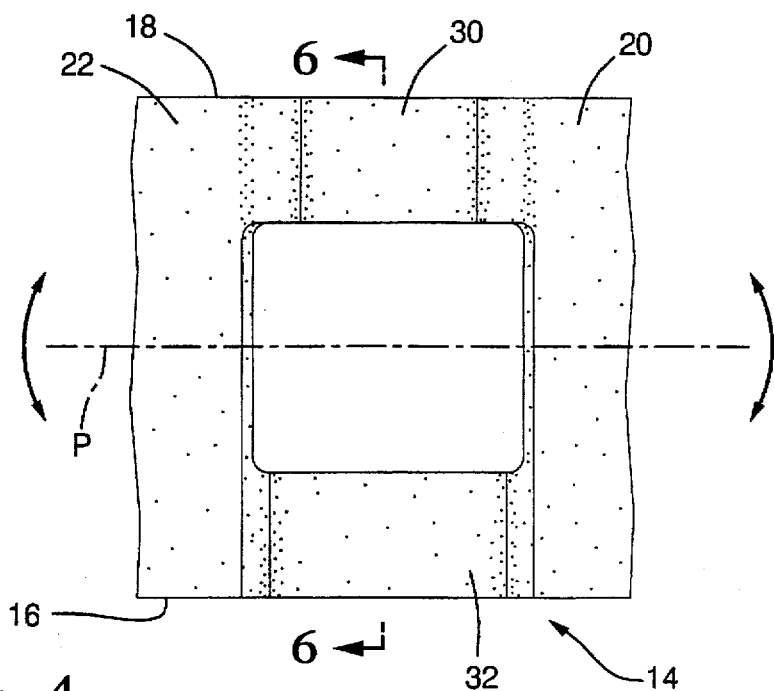
FIG. 4 is an enlarged view looking radially in at the flexible connectors located between two adjacent roller pockets.
Figure 5:
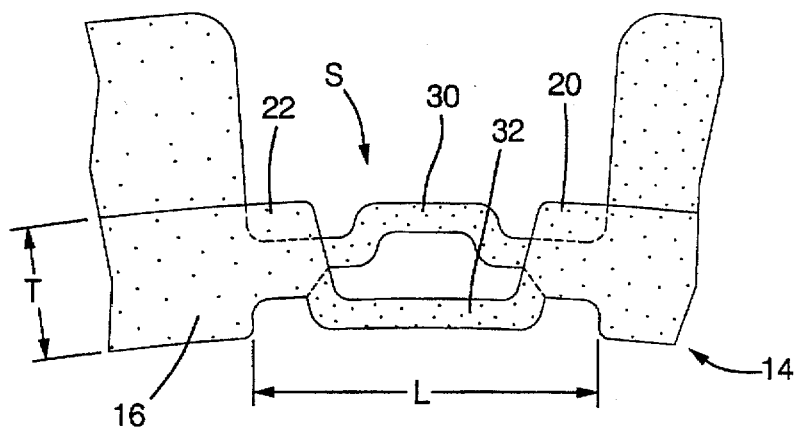
FIG. 5 is a side view of the same flexible connectors in a nominal position.

Referring next to FIGS. 3 through 5, the roller clutch cage of the invention, a preferred embodiment of which is indicated generally at 14, is generally annular, having the same central axis A as the races 10 and 12. Cage 14 is a unitary plastic piece, molded from nylon or other suitable material, by the now familiar axial draw or by pass technique. In general, as viewed along the axis A, none of the outer surfaces of either axial side of cage 14 overlap one another radially, so that it may be molded in its entirety by a single pair of molds that close and part along the same axis A. The other general structural feature of cage 14 is that it is substantially, although not completely, symmetrical about a central plane P shown by the dotted line in FIG. 4. Plane P is perpendicular to axis A, and bisects cage 14. More specifically, cage 14 is comprised of an evenly circumferentially spaced plurality of roller pockets arrayed in a circle about axis A, each pocket being made up in part of a pair of axially spaced, circumferentially extending side rails 16 and 18. Side rail 18 is considerably widened radially so as to engage the face of outer race 12 and act as an axial stop when cage 14 is installed, while side rail 16 is quite narrow, so as to have no radial overlap with wider side rail 18. This is the typical "over-under" relation that allows for moldability. Consequently, neither side rail 16 or 18 is a possible candidate for the kind of flexible member built into the side rails that the Husmann patent teaches. A four sided, basically rectangular roller pocket is completed by a pair of circumferentially spaced, axially extending cross bars 20 and 22. Each cross bar 20 is adjacent to and circumferentially spaced from the cross bar 22 of the adjacent pocket, forming an interstitial space indicated at S. The space S has a predetermined circumferential length L and a radial thickness equal to the coaxial radial spacing between the races 10 and 12, when cage 14 is at a nominal or normal operating temperature. The cross bars 20 and 22 are both radially thick, as indicated at T, nearly as thick as the nominal spacing between the races 10 and 12. In addition, they are relatively circumferentially wide, and can therefore both act as effective journal blocks or bearings to maintain the races 10 and 12 substantially coaxial. Consequently, the cross bars 20 and 22 are both also rigid and relatively inflexible. Riding back and forth between the side rails 16, 18 and the cross bars 20, 22, are a plurality of cylindrical rollers 24, each held in a roller control car 26, and continually biased in a clockwise direction by an accordion type energizing spring 28. The roller control car 26 rides on the side rails 16, 18, and is guided thereby. In general, therefore, the roller pockets formed by the rails 16, 18 and cross bars 20, 22 have functions to perform and consequent physical characteristics that make them unsuitable candidates for known means of providing give or yield. Nevertheless, they will be subjected to differential expansion and contraction, relative to the races 10 and 12, with changing temperature, thereby causing the circumference of the whole cage 14 to grow or shrink, and potentially over stressing it, if some kind of yielding mechanism is not provided. The invention provides a novel yielding mechanism that is entirely independent of the roller pockets, and which resides and acts entirely within the interstitial spaces S.

Figure 6:
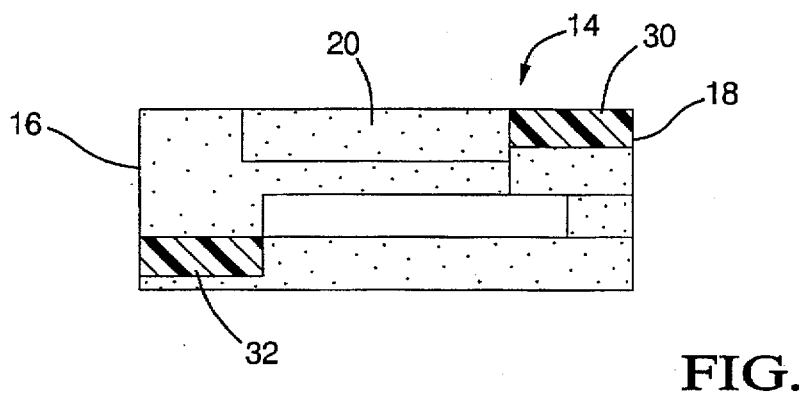
FIG. 6 is a cross section taken through the plane represented by the line 6—6 of FIG. 4.

Referring next to FIGS. 4 through 6, the adjacent cross bars 20 and 22 of each pair of adjacent roller pockets are joined together by a pair of flexible connecting members, indicated at 30 and 32. Each connecting member 30 and 32 is basically arcuate or C shaped, with member 30 opening radially upwardly, and 32 radially outwardly. In terms of circumferential length, axial width and radial thickness, each member 30 and 32 fits entirely within the space S. That space is far larger than the very narrow space that would be available within even a full width pocket side rail, however. The two members 30 and 32 are not radially opposed, as in the Husmarm design. Consequently, they are not limited in terms of arcuate extent to half the radial width of a side rail. Furthermore, the members 30 and 32 are axially spaced apart, as best seen in FIG. 4, evenly spaced to either side of the central plane P, and each is only about a quarter as axially wide as the space S itself. There is therefore a substantial open space left between them that is centered on the central plane P. In addition to having no axial overlap, each pair of members 30 and 32 has no radial overlap, as seen in FIG. 6, with member 32 being in the outer half of the radial space between the races 10 and 12, and member 30 in the inner half. This is the same basic "over-under" relationship as the side rails 16 and 18 that allows by pass molding. Each member 30 and 32 can also be made relatively radially thin, since it does not have to support any load between the races 10 and 12. In sum, then, each curved flexible member 30 and 32 is relatively thin and narrow, but subtends a fairly large arc. Each is therefore relatively flexible in the circumferential direction, unlike the heavy cross bars 20 and 22. Despite that flexibility, the fact that the members 30 and 32 are axially spaced apart and join the opposed corners of the adjacent cross bars 20 and 22 means that, prior to and during installation, the roller pockets are well supported against tipping or skewing relative to one another in the direction shown by the arrows in FIG. 4, giving the cage 14 good planar stability. A single, axially narrow, connecting member lying at the center of the cross bars 20 and 22 and on the plane P would not provide nearly as much resistant to cage deformation. The most important purpose of the members 30 and 32 is the yield that they provide after installation of cage 14, however, described next.

Figure 7:
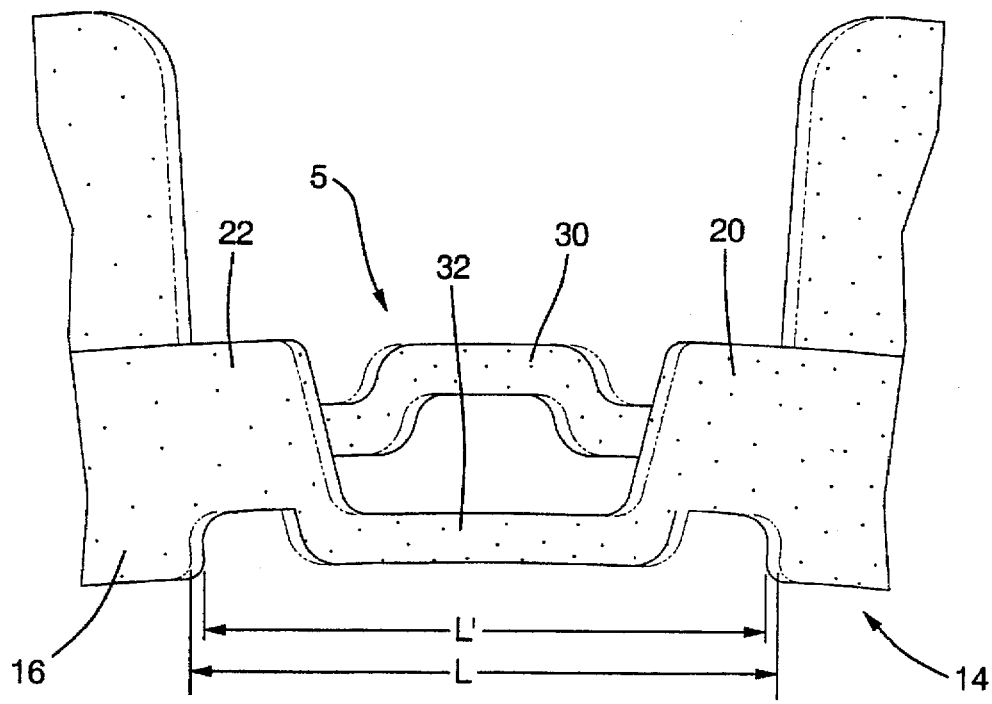
FIG. 7 is a view of the flexible connectors like FIG. 5, but showing the nominal position in dot-dash lines and the response to rising temperature in solid lines.
Figure 8:
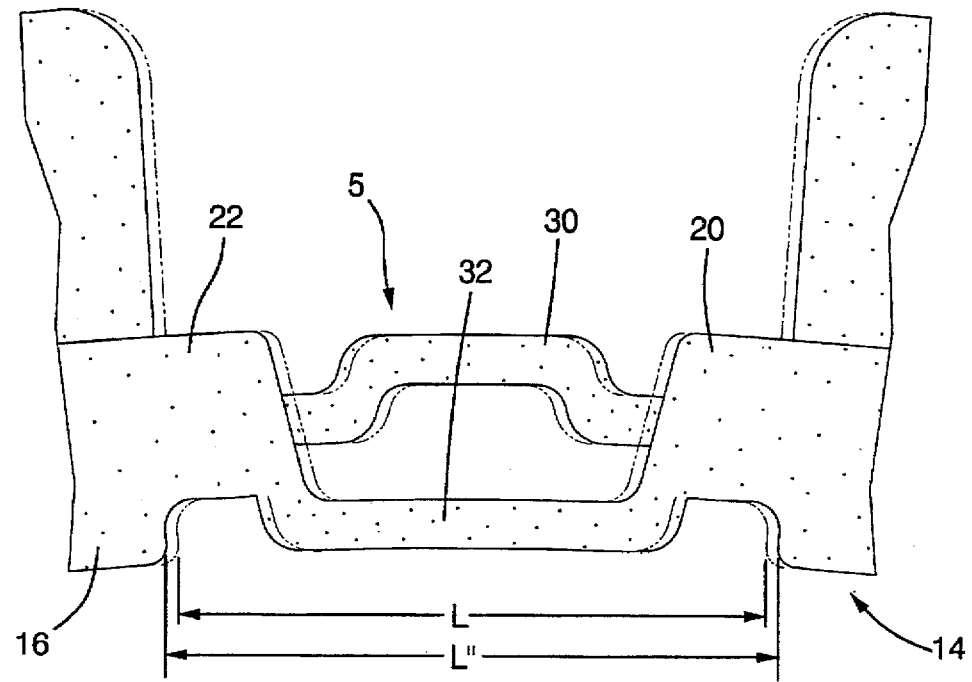
FIG. 8 is a view like FIG. 7, but showing the response to falling temperature in solid lines.

Referring next to FIGS. 2, 7 and 8, the improved response of cage 14 to temperature deviations from the nominal is depicted. Referring first to FIG. 7, the nominal configuration of cage 14 is indicated in dot-dash lines. With rising temperature, the length and thickness of the cage side rails 16, 18 and the cross bars 20, 22 grows, forcing the entire circumference of cage 14 to grow at a more rapid rate than outer race 12. As a consequence, the adjacent pairs of cross bars 20 and 22 will attempt to move together circumferentially, shortening the space S to L'. Yielding to and accommodating that tendency, the curved flexible members 30 and 32 can close up slightly, allowing the space S to shorten in the circumferential direction, without over compressing or buckling the cage 14. With falling temperatures, as shown in FIG. 8, the cage 14 tends to shrink overall in circumference more than the inner race 10, and can potentially wrap and bind thereon in tension. Now, the curved member 30 and 32 can open up wider, allowing the space S to lengthen in the circumferential direction to L" and prevent excess tension, despite the fact that both cross bars 20 and 22 are very stiff and inflexible. As best seen in FIG. 2, the opening left between the axially space member 30 and 32, since it is centered on the lubrication passage 13, allows pressurized lubricant to flow unhindered radially outwardly and into the inner surface of outer race 12, lubricating the outer surfaces of the cross bars 20 and 22 when the outer race 12 free wheels in the relative counterclockwise direction. Again, it should be recalled that post installation, the connecting members 30 and 32 have no function in terms of load support between the races 10 and 12, or guidance and retention of the rollers 24 and springs 28. In fact, after installation, the members 30 and 32 really are not needed to space the roller pockets apart circumferentially, since they are located and fixed solidly on the saw-toothed inner race 10. Still, the connecting members 30 and 32 are necessary for structural integration of cage 14 pre installation and, post installation, they provide the additional advantage of thermal accommodation between the races 10 and 12. This function is provided entirely independently of the roller pockets of cage 14, and without limiting the function or shape of the cross bars 20, 22 or of the side rails 16, 18.

Variations in the connecting members 30 and 32 could be made, while providing the same basic functions. A single curved member could be used, one which opened either radially outwardly or inwardly, and which ran the full axial length of the space S or less, but centered on the plane P. Or, a single, arcuate connecting member, centered on the plane P that was inflexible but for a curved, flexible central portion could be provided. Or, two connecting members, spaced to either side of the central plane P in the same "over-under" relation, but curved in the axial direction, rather than the radial direction, could be used. A single, wider connecting member, or two narrower, axially spaced members, provide the better resistance to pre installation cage deformation, as opposed to single, narrow connecting members centered on the plane P. Axially spaced pairs of connecting members provide better lubrication flow, as well, because they do not block lubrication passages. Therefore, it will be understood that it is not intended to limit the invention to just the embodiment disclosed.

We claim:

1. A unitary cage for a one way clutch that is adapted to be installed in the annular space between inner and outer coaxial clutch races, and which retains a complement of spring energized rollers in said annular space, and in which the material of said cage and said races have differing coefficients of thermal expansion and contraction, so that said cage tends to shrink more with falling temperature and be put into tension around said inner race, and to expand more with rising temperature and be put into compression against said outer race, said unitary cage comprising, a plurality of evenly spaced, generally rectangular roller pockets arranged in a generally circular pattern about a central axis, each pair of adjacent pockets having a pair of circumferentially spaced, axially extending cross bars of sufficient circumferential width and radial thickness to provide load support between said races, whereby said cross bars are relatively inflexible, with adjacent cross bars defining an interstitial space therebetween with a nominal circumferential length, and, at least one circumferentially flexible connecting member extending across each pair of adjacent cross bars of each pair of adjacent pockets, said flexible connecting member being curved so as to be capable of closing and narrowing when said cage is put into compression and opening and widening when said cage is put into tension, thereby allowing the nominal circumferential length of said interstitial space to shorten and lengthen respectively and thereby accommodate the differential in expansion and contraction between said cage and races despite the inflexibility of said cage cross bars.

2. A unitary cage for a one way clutch that is adapted to be installed in the annular space between inner and outer coaxial clutch races, and which retains a complement of spring energized rollers in said annular space, and in which the material of said cage and said races have differing coefficients of thermal expansion and contraction, so that said cage tends to shrink more with falling temperature and be put into tension around said inner race, and to expand more with rising temperature and be put into compression against said outer race, said unitary cage comprising, a plurality of evenly spaced, generally rectangular roller pockets arranged in a generally circular pattern about a central axis, each pair of adjacent pockets having a pair of circumferentially spaced, axially extending cross bars of sufficient circumferential width and radial thickness to provide load support between said races, whereby said cross bars are relatively inflexible, with adjacent cross bars defining an interstitial space therebetween with a nominal circumferential length, and, a pair of circumferentially flexible connecting members extending across each pair of adjacent cross bars of each pair of adjacent pockets, said flexible connecting members being curved so as to be capable of closing and narrowing when said cage is put into compression and opening and widening when said cage is put into tension, thereby allowing the nominal circumferential length of said interstitial space to shorten and lengthen respectively and thereby accommodate the differential in expansion and contraction between said cage and races despite the inflexibility of said cage cross bars.

3. A unitary cage for a one way clutch that is adapted to be installed in the annular space between inner and outer coaxial clutch races, and which retains a complement of spring energized rollers in said annular space, and in which the material of said cage and said races have differing coefficients of thermal expansion and contraction, so that said cage tends to shrink more with falling temperature and be put into tension around said inner race, and to expand more with rising temperature and be put into compression against said outer race, said unitary cage comprising, a plurality of evenly spaced, generally rectangular roller pockets arranged in a generally circular pattern about a central axis, each pair of adjacent pockets having a pair of circumferentially spaced, axially extending cross bars of sufficient circumferential width and radial thickness to provide load support between said races, whereby said cross bars are relatively inflexible, with adjacent bars defining an interstitial space therebetween with a nominal circumferential length, and, a pair of circumferentially flexible connecting members extending across each pair of adjacent cross bars of each pair of adjacent pockets, said flexible connecting members being axially spaced apart and radially curved in opposite directions so as to be capable of closing and narrowing when said cage is put into compression and opening and widening when said cage is put into tension, thereby allowing the nominal circumferential length of said interstitial space to shorten and lengthen respectively and thereby accommodate the differential in expansion and contraction between said cage and races despite the inflexibility of said cage cross bars.

* * * * *